United States Patent

Chiang (10) Patent No.: US 10,827,056 B2
(45) Date of Patent: Nov. 3, 2020

(54) SILENT DIALING FOR EMERGENCY CALLS

(71) Applicant: T-MOBILE USA, INC., Bellevue, WA (US)

(72) Inventor: Hsin-Fu Henry Chiang, Bellevue, WA (US)

(73) Assignee: T-MOBILE USA, INC., Bellevue, WA (US)

( * ) Notice: Subject to any disclaimer, the term of this patent is extended or adjusted under 35 U.S.C. 154(b) by 0 days.

(21) Appl. No.: 16/740,649

(22) Filed: Jan. 13, 2020

(65) Prior Publication Data

US 2020/0314231 A1 Oct. 1, 2020

Related U.S. Application Data

(63) Continuation of application No. 16/364,860, filed on Mar. 26, 2019, now Pat. No. 10,582,035.

(51) Int. Cl.
*H04M 11/04* (2006.01)
*H04M 1/725* (2006.01)
*H04W 4/02* (2018.01)
*H04W 4/90* (2018.01)

(52) U.S. Cl.
CPC ... *H04M 1/72541* (2013.01); *H04M 1/72552* (2013.01); *H04W 4/025* (2013.01); *H04W 4/90* (2018.02)

(58) Field of Classification Search
USPC .............. 455/404.2, 404.1, 563; 340/539.32, 340/539.11
See application file for complete search history.

(56) References Cited

U.S. PATENT DOCUMENTS

| | | | |
|---|---|---|---|
| 8,446,274 B1 * | 5/2013 | Crook ................ | G01N 33/0075 340/539.11 |
| 10,127,777 B1 | 11/2018 | Agrawal et al. | |
| 10,147,319 B1 * | 12/2018 | Chen ..................... | B60W 50/14 |
| 2003/0104800 A1 * | 6/2003 | Zak ....................... | G08B 25/001 455/404.1 |

(Continued)

OTHER PUBLICATIONS

Apple Inc., "Use Emergency SOS on your iPhone", Apr. 10, 2019 [retrieved on Jul. 9, 2019]. Retrieved from the Internet: <URL: https://support.apple.com/en-us/HT208076>.

(Continued)

*Primary Examiner* — David Q Nguyen
(74) *Attorney, Agent, or Firm* — Marshall, Gerstein & Borun LLP (57) ABSTRACT

Techniques for automatically initiating the transmission of a silent emergency message via a mobile computing device are provided. A mobile device may receive a plurality of indications of a plurality of external buttons of the mobile computing device being pressed over a time interval. Based on the plurality of indications, the mobile computing device may determine that two or more external buttons have been pressed in a fixed sequence over the time interval. In response to determining that the two or more external buttons of the mobile computing device have been pressed in the fixed sequence, the mobile computing device may silently transmit a message to a computing device associated with an emergency contact, without activating a display screen of the device or making sounds.

20 Claims, 3 Drawing Sheets

(56) References Cited

U.S. PATENT DOCUMENTS

| | | |
|---|---|---|
| 2005/0221866 A1 | 10/2005 | Huang et al. |
| 2010/0297981 A1 | 11/2010 | Ballantyne et al. |
| 2010/0323657 A1 | 12/2010 | Barnard et al. |
| 2011/0201385 A1* | 8/2011 | Higginbotham ...... G10L 13/043 |
| | | 455/563 |
| 2011/0210849 A1 | 9/2011 | Howard et al. |
| 2011/0319051 A1 | 12/2011 | Reitnour |
| 2012/0115430 A1 | 5/2012 | Hawkes et al. |
| 2012/0166696 A1 | 6/2012 | Kallio et al. |
| 2014/0252927 A1* | 9/2014 | Denny ................ G08B 1/08 |
| | | 312/209 |
| 2014/0274025 A1 | 9/2014 | Paul et al. |
| 2014/0368601 A1 | 12/2014 | deCharms |
| 2016/0037319 A1* | 2/2016 | Hafeman ............. H04W 4/029 |
| | | 455/404.2 |
| 2017/0026504 A1* | 1/2017 | Nichols ............... A61B 5/7405 |
| 2017/0245130 A1 | 8/2017 | Mehta et al. |
| 2017/0318146 A1 | 11/2017 | Peter |
| 2018/0220469 A1 | 8/2018 | Chen |
| 2019/0172335 A1 | 6/2019 | Johnston-Mitchell |
| 2019/0260868 A1* | 8/2019 | Graham ............... H04W 4/48 |
| 2019/0274026 A1 | 9/2019 | Hamilton et al. |

OTHER PUBLICATIONS

Apple Inc., "Make an emergency call from locked iPhone", Sep. 17, 2018 [retrieved on Jul. 9, 2019]. Retrieved from the Internet: <URL: https://support.apple.com/en-us/HT209053>.

Apple Inc., "Make emergency calls on iPhone", 2019 [retrieved on Jul. 9, 2019]. Retrieved from the Internet: <URL: https://support.apple.com/guide/iphone/make-emergency-calls-iph3c99374c/ios>.

Gadget Hacks, "Use the SOS Feature on Your Samsung Galaxy Phone in Case of an Emergency", Apr. 20, 2019 [retrieved on Jul. 9, 2019]. Retrieved from the Internet: <URL: https://gs6.gadgethacks.com/how-to/use-sos-feature-your-samsung-galaxy-phone-case-emergency-0161449/>.

European Patent Application No. 20165983.6, Extended European Search Report, dated Jul. 16, 2020.

\* cited by examiner

SILENT DIALING FOR EMERGENCY CALLS

CROSS-REFERENCE TO RELATED APPLICATIONS

The present application is a continuation of U.S. application Ser. No. 16/364,860, filed Mar. 26, 2019, entitled "Silent Dialing for Emergency Calls," the disclosure of which is hereby incorporated by reference for all purposes.

FIELD OF THE DISCLOSURE

The present disclosure generally relates to mobile computing devices and, more particularly, to techniques for automatically initiating the transmission of a silent emergency message via a mobile computing device.

BACKGROUND

The background description provided herein is for the purpose of generally presenting the context of the disclosure. Work of the presently named inventors, to the extent it is described in the background section, as well as aspects of the description that may not otherwise qualify as prior art at the time of filing, are neither expressly nor impliedly admitted as prior art against the present disclosure.

Many individuals carry mobile computing devices with them at all times. In emergency situations, individuals can use mobile computing devices to contact help, e.g., by calling a provider of emergency services (such as a hospital, police station, fire department, etc.) or calling an emergency contact (such as a relative or a significant other). Under ordinary operation, a user cannot place a call to a user's personal contacts without unlocking the mobile computing device (e.g., via a password, via fingerprint identification, via facial recognition software, etc.), which can cause problems in situations where the user needs to place an emergency call. To partially solve such problems, many mobile computing devices allow users to bypass a lock screen to place emergency calls to emergency dispatch center numbers (e.g., 9-1-1 calls). For example, a user who is borrowing another user's mobile device may be unable to unlock the device because he or she cannot provide the password or proper fingerprint or facial identification associated with the mobile computing device, but such user may nonetheless place an emergency 9-1-1 call. Even when a user desires to call an emergency dispatch center, however, the user must interact with the screen to place such call. Placing such an emergency call will typically also result in activation of a speaker of the mobile computing device, either before or during the emergency call. Interacting with the screen and activating the speaker may put the user at further risk during some emergency scenarios. Moreover, even when a user is able to unlock the mobile computing device or place an emergency call without unlocking the device, the process of placing such call may add unnecessary time to the process of notifying an emergency contact, which can be detrimental in an emergency situation where an immediate response is needed.

Currently, some mobile computing devices solve these problems by allowing users to bypass password or identification requirements when placing emergency calls to emergency dispatch centers. In one example, holding down or repeatedly pressing an external button of the mobile computing device will cause the mobile computing device to bypass password or identification requirements and display a screen including a prompt for the user to confirm whether or not he or she intends to begin an emergency call (e.g., by tapping or sliding the prompt via the touchscreen of the mobile computing device). If the user does not confirm whether or not he or she intends to begin an emergency call via the prompt displayed on the screen, a countdown begins and an alert sounds, so the user knows the emergency call will commence shortly and can stop it if needed (e.g., if the button was held down or repeatedly pressed accidentally). Once the countdown ends, the mobile computing device automatically calls emergency services.

However, this solution presents its own problems. For example, in some types of emergency scenarios (such as, e.g., a kidnapping, a burglary or robbery, a mugging, an active shooter situation, etc.), a hostile perpetrator may react violently if he or she notices a victim or potential victim attempting to place an emergency call. Consequently, anything that draws attention to the fact that a user is placing an emergency call (e.g., instances in which users must tap or slide a prompt via a touchscreen, flashing screens, loud alerts or countdowns, etc.) can be dangerous or even fatal to a user in an emergency situation involving a hostile perpetrator.

Additionally, if a young child takes a parent's mobile computing device, the child can easily unintentionally initiate an emergency call by playing with the external buttons of the mobile computing device and holding down or pressing the buttons repeatedly. Moreover, flashing screens or loud noises coming from the mobile computing device as a result of pressing or holding the buttons may only encourage a child to continue pressing or holding the buttons. Consequently, unnecessary emergency calls may be placed, wasting the time and resources of providers of emergency services, and diverting their attention away from real emergencies.

SUMMARY

Generally speaking, the present disclosure provides techniques for automatically initiating the transmission of a silent emergency message via a mobile computing device.

In one aspect, a computer-implemented method for automatically initiating the transmission of a silent emergency message via a mobile computing device is provided. The computer-implemented method comprises: receiving a plurality of indications of a plurality of external buttons of the mobile computing device being pressed over a time interval; determining that two or more external buttons of the plurality of external buttons of the mobile computing device have been pressed in a fixed sequence over the time interval based upon the plurality of indications; and silently transmitting a message to a computing device associated with an emergency contact in response to determining the two or more external buttons of the mobile computing device having been pressed in the fixed sequence.

In another aspect, a mobile computing device for automatically initiating the transmission of a silent emergency message is provided. The mobile computing device comprises two or more external buttons; one or more processors; and one or more memories storing instructions that, when executed by the one or more processors, cause the mobile computing device to: receive a plurality of indications of a plurality of external buttons of the mobile computing device being pressed over a time interval; determine that two or more external buttons of the plurality of external buttons of the mobile computing device have been pressed in a fixed sequence over the time interval based upon the plurality of indications; and silently transmit a message to a computing device associated with an emergency contact in response to determining the two or more external buttons of the mobile computing device having been pressed in the fixed sequence.

In still another aspect, a tangible, non-transitory computer-readable medium storing executable instructions for automatically initiating the transmission of a silent emergency message is provided. The instructions, when executed by at least one processor of a mobile computing device, cause the mobile computing device to: receive a plurality of indications of a plurality of external buttons of the mobile computing device being pressed over a time interval; determine that two or more external buttons of the plurality of external buttons of the mobile computing device have been pressed in a fixed sequence over the time interval based upon the plurality of indications; and silently transmit a message to a computing device associated with an emergency contact in response to determining the two or more external buttons of the mobile computing device having been pressed in the fixed sequence.

DETAILED DESCRIPTION

Generally speaking, the present disclosure provides techniques for automatically initiating the transmission of a silent emergency message (which may be, e.g., a call, a text message, an SMS message, etc.) via a mobile computing device. In one example, a mobile computing device transmits a silent emergency message when two or more external buttons of the mobile computing device are pressed in a particular fixed sequence. For instance, pressing a power button twice, then pressing a camera button twice, then pressing the power button twice may trigger a silent emergency call. Advantageously, because it is unlikely that a user will accidentally press multiple external buttons of the mobile computing device in the fixed sequence, the emergency message can be transmitted automatically without requiring on-screen confirmation or a loud alert to notify the user that the call is being placed. In contrast, there is a higher likelihood of a user accidentally holding down one or more buttons or repeatedly pressing the same button. Accordingly, because no on-screen confirmation or loud alert is required to initiate the emergency call, a user can easily press the external buttons of the mobile computing device in the fixed sequence to initiate an emergency call without drawing attention to the fact that the user is placing the emergency call. For instance, a user can even initiate an emergency call with the mobile computing device hidden behind his or her back, or in a purse or pocket, in an emergency scenario. Additionally, the lack of on-screen confirmation or loud alert may discourage children playing with mobile computing devices from pressing the external buttons of the mobile computing device in the fixed sequence. Without the stimulus of a flashing screen or loud noises, children may lose interest in pressing the external buttons of a mobile device completely.

Figure 1:
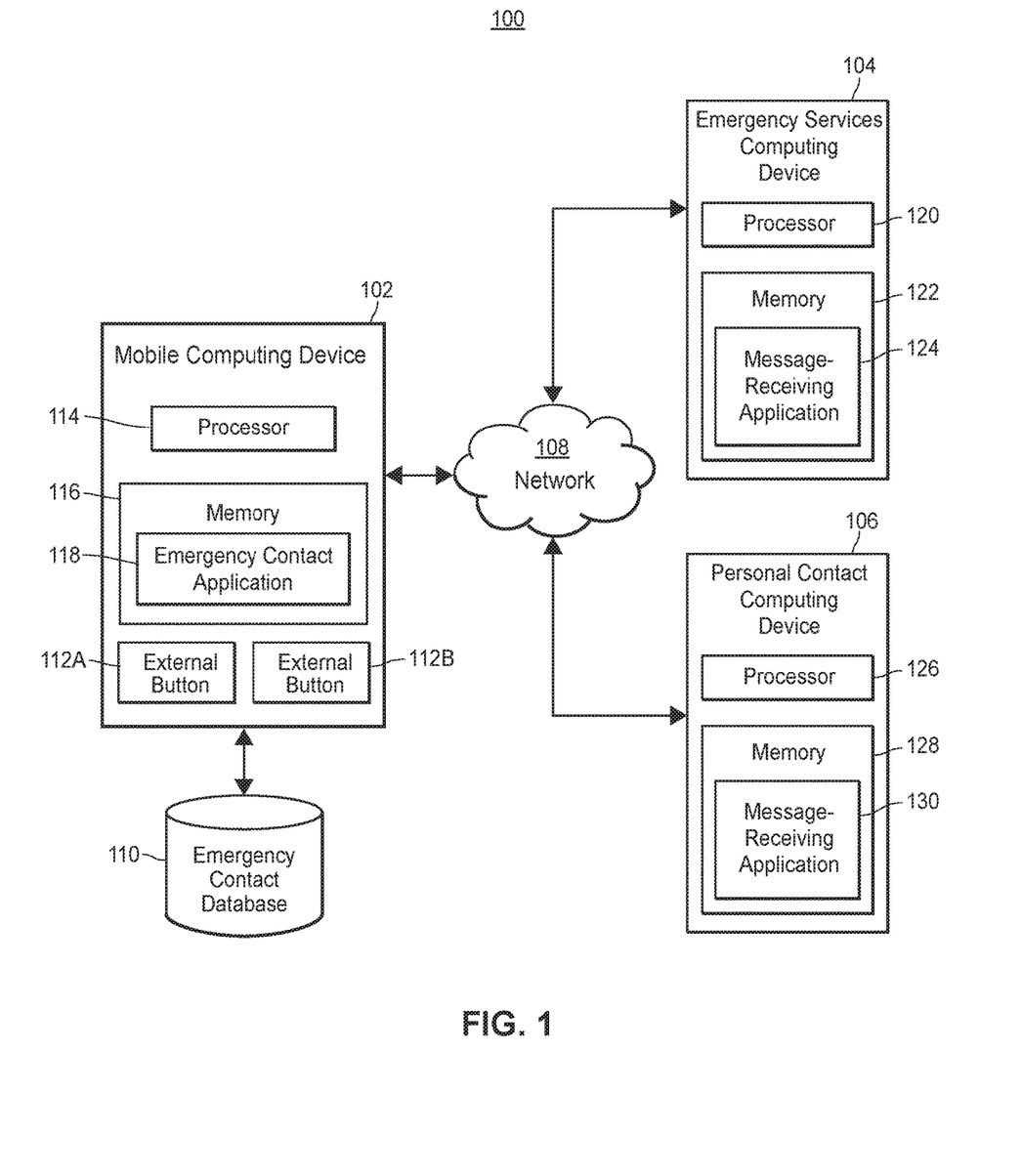
FIG. 1 illustrates an exemplary computer system in which techniques for automatically initiating the transmission of a silent emergency message via a mobile computing device may be implemented, in accordance with some embodiments.

Referring now to FIG. 1, an exemplary computer system in which techniques for automatically initiating the transmission of a silent emergency message via a mobile computing device may be implemented is illustrated in accordance with some embodiments. The high-level architecture illustrated in FIG. 1 may include both hardware and software applications, as well as various data communication channels for communicating data between the various hardware and software components, as is described below.

Figure 2:
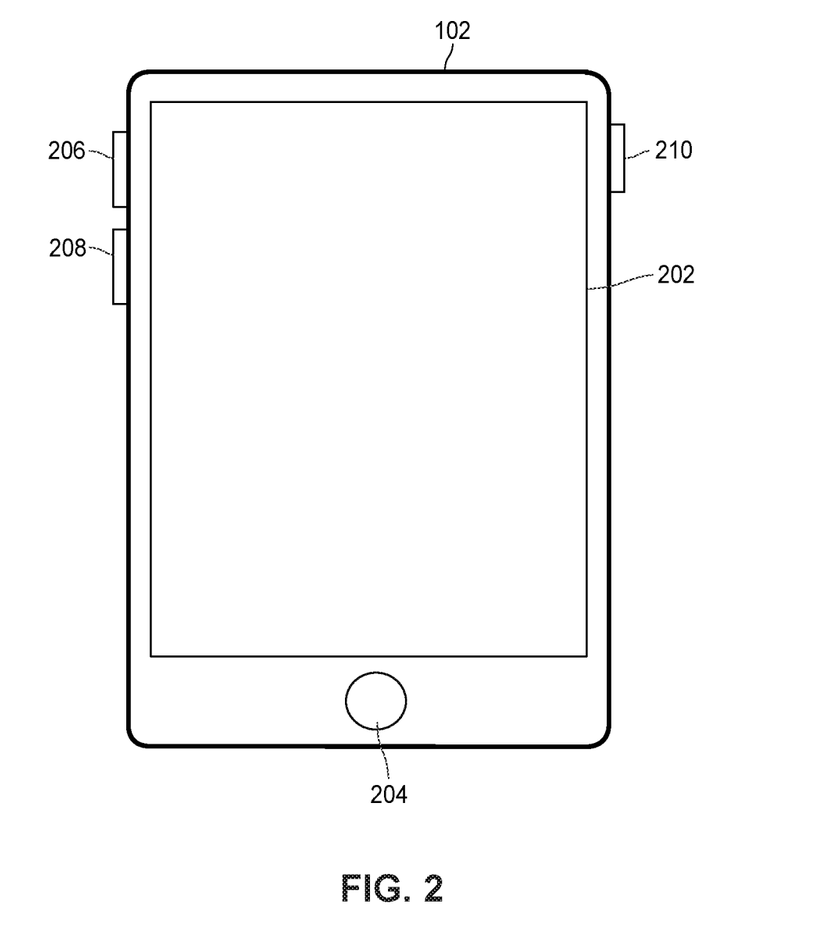
FIG. 2 illustrates an exemplary mobile computing device operable within the system of FIG. 1, in accordance with some embodiments.

As shown in FIG. 1, a mobile computing device 102 may be configured to transmit emergency messages (e.g., calls, text messages, SMS messages, etc.) to computing devices and/or telephony devices associated with emergency contacts, such as an emergency services computing device 104 and a personal contact computing device 106, via a network 108 (which may be, e.g., a cellular network, a local area network (LAN), a wide area network (WAN) such as the internet, etc.), using emergency contact data stored in an emergency contact database 110. The mobile computing device 102 can be, for example, a personal computer, a portable device such as a tablet computer or smartphone, a wearable computing device, etc., configured to silently transmit these emergency messages based on receiving an indication that external buttons 112A and 112B of the mobile computing device 102 have been pressed in a particular fixed order or sequence. For example, the external buttons 112A and 112G may include a power button, a camera button, a volume up button, and/or a volume down button, etc., as shown in FIG. 2, or any other suitable external mobile device buttons. In some embodiments, the external buttons 112A and 112G may include sliding buttons or switches, such as a lock switch. Moreover, although two external buttons 112A and 112B are shown in FIG. 1, any number of external buttons 112A, 112G may be included in various embodiments.

In addition to the external buttons 112A and 112G, the mobile computing device 102 may include one or more processors 114 (which may be, e.g., microcontrollers or microprocessors) and a memory 116. The memory 116 of the mobile computing device 102 may be a non-transitory memory and may include one or several suitable memory modules, such as random access memory (RAM), read-only memory (ROM), flash memory, other types of persistent memory, etc.

The memory 116 may further include an emergency contact application 118. Generally speaking, the emergency contact application 118 may perform one or more functions related to, inter alia, storing or obtaining a fixed sequence of external button presses associated with an emergency contact, storing or obtaining other information about various emergency contacts, receiving indications when the external buttons 112A and/or 112G have been pressed, determining when the external buttons 112A and 112B have been pressed in the fixed sequence, silently transmitting a message to an emergency services computing device 104 or personal contact computing device 106 based on the determination that the external buttons 112A and 112B have been pressed in the fixed sequence, etc. For example, the emergency contact application 118 may perform at least a portion of any of the method 300 shown in FIG. 3.

Moreover, the emergency services computing device 104 may include one or more processors 120 (which may be, e.g., microcontrollers or microprocessors) and a memory 122. The memory 122 may be a non-transitory memory and may include one or several suitable memory modules, such as random access memory (RAM), read-only memory (ROM), flash memory, other types of persistent memory, etc. The memory 122 may further include a message-receiving application 124. Generally speaking, the message-receiving application 124 may perform one or more functions related to, inter alia, receiving messages transmitted by the mobile computing device 102 via the network 108.

Similarly, the personal contact computing device 106 may include one or more processors 126 (which may be, e.g., microcontrollers or microprocessors) and a memory 128. The memory 128 may be a non-transitory memory and may include one or several suitable memory modules, such as random access memory (RAM), read-only memory (ROM), flash memory, other types of persistent memory, etc. The memory 128 may further include a message-receiving application 130. Generally speaking, like the message-receiving application 124, the message-receiving application 130 may perform one or more functions related to, inter alia, receiving messages transmitted by the mobile computing device 102 via the network 108.

Additionally or alternatively, the system may include one or more telephones or other telephony devices (not shown), such as additional mobile computing devices associated with other users. In particular, one or more of the emergency services computing device 104 and/or the personal contact computing device 106 may be replaced with an emergency services telephone or a personal contact telephone (respectively) in various embodiments. Accordingly, the mobile computing device 102 may transmit silent emergency phone calls to the emergency services telephones or personal contact telephones via a telephone network in some embodiments. Such silent emergency phone calls may include standard or pre-recorded audio messages for presentation to the receiving party, while being silent with respect to the mobile computing device 102.

Referring now to FIG. 2, an exemplary mobile computing device 102 operable within the system of FIG. 1 is illustrated in accordance with some embodiments. For example, the mobile computing device 102 may include a display screen 202, as well as an external power button 204, an external volume up button 206, an external volume down button 208, and an external camera button 210. Of course, in various embodiments, mobile computing devices 102 may include additional, fewer, or alternative external buttons than the external buttons 204-210 shown in FIG. 2. Moreover, in some embodiments, mobile computing devices 102 may include external buttons located in different locations than the external buttons 204-210 shown in FIG. 2. However, in any case, mobile computing devices 102 generally include two or more external buttons, such as external buttons 204-210, that can be physically actuated by a user of the mobile computing device 102, such as by pressing a respective button or sliding a switch. In embodiments in which the external buttons 204-210 include one or more sliding switches or other similar buttons not having a single default position, actuating such an external button may include selecting a position, such as by switching between multiple positions. As discussed elsewhere herein, actuating (e.g., pressing) the external buttons 204-210 may occur without unlocking the mobile computing device 102 and without necessarily activating the display screen 202 of the mobile computing device 102.

Figure 3:
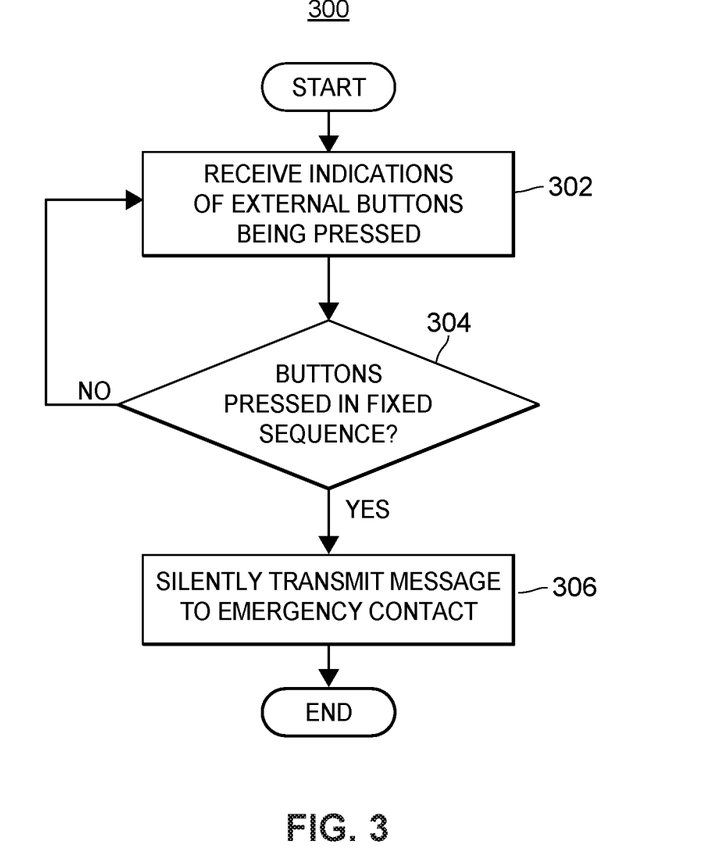
FIG. 3 illustrates a flow diagram of an exemplary computer-implemented method of automatically initiating the transmission of a silent emergency message via a mobile computing device, in accordance with some embodiments.

Turning now to FIG. 3, a flow diagram of an exemplary computer-implemented method of automatically initiating the transmission of a silent emergency message via a mobile computing device is illustrated in accordance with some embodiments. The method 300 can be implemented as a set of instructions stored on a computer-readable memory and executable on one or more processors.

An indication of external buttons (e.g., external buttons 204-210) being pressed or otherwise actuated may be received (block 302), e.g., by the mobile computing device 102. For instance, the processor 114 may receive electronic signals indicating actuation of a power button, a volume up button, a volume down button, a camera button, etc. In some embodiments, the emergency contact application 118 may be configured to continuously monitor signals received from the external buttons. For efficiency and to reduce the likelihood of accidental emergency message transmission, the emergency contact application 118 may discard indications of external buttons being pressed or otherwise actuated after a fixed time interval.

The mobile computing device 102 may determine (block 304) whether the external buttons were pressed in a fixed sequence. For example, the fixed sequence may be a sequence of a power button, then a camera button, then the power button again. In another example, the fixed sequence may be a sequence of a volume up button twice (or three times, or four times, etc.), then a camera button twice (or three times, or four times, etc.), then the volume up button twice (or three times, or four times, etc.). In some embodiments, in order to reduce the likelihood of accidental transmission of an emergency message, at least one button of the sequence may be required to be an external button not associated with volume (e.g., an external power button 204 or an external camera button 210). Similarly, due to their close placement on many mobile computing devices 102, the external volume up button 206 and the external volume down button 208 may be treated as the same button in some embodiments. The fixed sequence may be any sequence or order of external buttons pressed by the user of the mobile computing device. In some examples, the fixed sequence may be pre-set, while in other examples, the fixed sequence may be selected by the user. Due to its familiarity from the representation of the SOS sequence in Morse code (i.e., . . . - - - . . . ), a pattern of three presses of a first button (B1), followed by three presses of a second button (B2), followed by three presses of the first button (B1) may be used as the fixed sequence (i.e., B1-B1-B1-B2-B2-B2-B1-B1-B1).

In some embodiments the specific external buttons pressed may be significant to the fixed sequence, such that only actuating a specific set of buttons in a particular pattern will trigger transmission of the emergency message (such that B1-B2-B1 does not equal B2-B3-B2). In other embodiments, the method 300 may be agnostic between the external buttons, such that any external buttons may be used as part of the pattern (such that B1-B2-B1 does equal B2-B3-B2). For example, the pattern may specify a particular number of actuations of any first button followed by particular number of actuations of any second external button (potentially with further actuations of the first button or third button, forth button, etc.).

In some examples, determining whether the external buttons were pressed in the fixed sequence may include determining whether each button in the fixed sequence was pressed within a certain window of time after each previous button. For example, in a sequence of a volume down button, then a power button, then the volume down button again, the mobile computing device 102 may determine whether the power button was pressed within a window of 3 seconds (or 1 second, 5 seconds, etc.) after the volume down button was pressed the first time, and whether the volume down button was pressed for a second time within a window of 3 seconds (or 1 second, 5 seconds, etc.) after the power button was pressed. Such window of time may be further divided into multiple consecutive time intervals, such as a first interval for a first portion of the sequence, a second time interval following the first time interval for a second portion of the sequence, etc.

If the external buttons are not pressed in the fixed sequence (block 304, NO), or if the buttons are not pressed within the window of time after each previous button, the method may repeat block 302, e.g., at the next time an indication of external buttons being pressed is received. If the external buttons are pressed in the fixed sequence (block 304, YES), the method may proceed to block 306.

Based on the external buttons being pressed in the fixed sequence, a message may be transmitted (block 306) silently, e.g., by the mobile computing device 102, to a computing device associated with an emergency contact (e.g., emergency services computing device 104 or personal contact computing device 106). The transmitted message may include a pre-selected written or voice message, e.g., "I am in danger, please send help." Additionally, in some embodiments the transmitted message may include a location associated with the user (e.g., GPS coordinates associated with the user detected by the mobile computing device 102).

In particular, the message may be transmitted without causing the mobile computing device 102 to emit any sounds, such as sounds associated with dialing, sounds associated with notifications or alerts, sounds associated with countdowns, sounds associated with confirmation of choices, etc. at any point in the process. That is, in some embodiments, the mobile computing device 102 may suppress any such sounds normally associated with messages, dialing, notifications, alerts, countdowns, choice confirmations, etc., during the process of transmitting the message. Moreover, in some embodiments, the message may be transmitted without activating the display screen of the mobile computing device 102 (e.g., without displaying a notification or confirmation or otherwise causing the display screen of the mobile computing device 102 to show anything other than a black screen or other default screen). That is, during the process of transmitting the message, the mobile computing device 102 may suppress any such display screen activations normally associated with messages, dialing, notifications, alerts, countdowns, choice confirmations, etc. Thus, in some embodiments, the mobile computing device 102 may suppress all visible or audible indications of activation of the mobile computing device 102 (i.e., without activating the device screen or making any sound), thereby silently transmitting the emergency message without alerting any nearby threats to the transmission.

Furthermore, in some examples, the message that may be transmitted is solely based on the external buttons being pressed in the fixed sequence, and no other input. That is, in some examples the mobile computing device 102 may transmit the emergency message automatically as soon as the external buttons are pressed in the fixed sequence, without requiring confirmation from the user. Accordingly, because no on-screen confirmation or audible alert is required to initiate the transmission of the message to the computing device associated with the emergency contact, a user may initiate the transmission of the message to the computing device associated with the emergency contact without drawing attention to the fact that the user is placing the emergency call.

In some examples, the emergency contact is a general contact for emergency services, such as, e.g., an emergency services computing device 104 associated with an emergency dispatch center, a local police department, a local fire department, and/or a local hospital. In other examples, the emergency contact is a personal contact, such as, e.g., a personal contact computing device 106 associated with a relative or a significant other. Moreover, in some examples, there may be multiple fixed sequences in which the external buttons can be pressed to trigger the emergency call. In some such examples, the mobile computing device 102 may transmit a message to a computing device associated with a particular emergency contact based on receiving an indication that one sequence of external buttons has been pressed, and may transmit a message to a different emergency contact based on receiving an indication that a different sequence of external buttons has been pressed. The emergency messages may be the same or different for the various recipients. For example, a sequence of volume up button, power button, camera button, volume up button, power button, camera button may cause the mobile computing device 102 to transmit a first message to an emergency services computing device 104 associated with local emergency services, while a sequence of volume down button, volume down button, camera button, camera button, power button, power button may cause the mobile computing device 102 to transmit a second message to a personal contact computing device 106 associated with a personal contact, such as a significant other or family member, where the first and second messages may be the same or may differ. The fixed sequences for each emergency contact may be pre-selected in some embodiments. In other embodiments, a user may select or create the fixed sequence associated with each emergency contact.

Although the preceding text sets forth a detailed description of numerous different embodiments, it should be understood that the legal scope of the invention is defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

It should also be understood that, unless a term is expressly defined in this patent using the sentence "As used herein, the term '______' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning.

Throughout this specification, unless indicated otherwise, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may likewise be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (code embodied on a non-transitory, tangible machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Hardware modules can provide information to, and receive information from, other hardware modules. Accordingly, the described hardware modules may be regarded as being communicatively coupled. Where multiple such hardware modules exist contemporaneously, communications may be achieved through signal transmission (e.g., over appropriate circuits and buses) that connects the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, in some embodiments, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" or "in some embodiments" in various places in the specification are not necessarily all referring to the same embodiment or embodiments.

Some embodiments may be described using the terms "coupled," "connected," "communicatively connected," or "communicatively coupled," along with their derivatives. These terms may refer to a direct physical connection or to an indirect (physical or communication) connection. For example, some embodiments may be described using the term "coupled" to indicate that two or more elements are in direct physical or electrical contact. The term "coupled," however, may also mean that two or more elements are not in direct contact with each other, but yet still co-operate or interact with each other. Unless expressly stated or required by the context of their use, the embodiments are not limited to direct connection.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the words "a" or "an" are employed to describe elements and components of the embodiments herein. This is done merely for convenience and to give a general sense of the description. This description, and the claims that follow, should be read to include one or at least one, and the singular also includes the plural unless the context clearly indicates otherwise.

Upon reading this disclosure, those of skill in the art will appreciate still additional alternative structural and functional designs for automatically initiating the transmission of a silent emergency message via a mobile computing device. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The particular features, structures, or characteristics of any specific embodiment may be combined in any suitable manner and in any suitable combination with one or more other embodiments, including the use of selected features without corresponding use of other features. In addition, many modifications may be made to adapt a particular application, situation or material to the essential scope and spirit of the present invention. It is to be understood that other variations and modifications of the embodiments of the present invention described and illustrated herein are possible in light of the teachings herein and are to be considered part of the spirit and scope of the present invention.

Finally, the patent claims at the end of this patent application are not intended to be construed under 35 U.S.C. § 112(f), unless traditional means-plus-function language is expressly recited, such as "means for" or "step for" language being explicitly recited in the claims.

What is claimed is:

1. A computer-implemented method for avoiding initiating accidental or unintentional transmission of a silent emergency message via a mobile computing device, comprising:
   receiving, at the mobile computing device, a plurality of indications of a plurality of external buttons of the mobile computing device being pressed over a time interval;
   determining, by the mobile computing device, that two or more external buttons of the plurality of external buttons of the mobile computing device have been pressed in a pre-set fixed sequence over the time interval based upon the plurality of indications; and
   silently transmitting, by the mobile computing device, a message to a computing device associated with an emergency contact in response to determining the two or more external buttons of the mobile computing device having been pressed in the pre-set fixed sequence, wherein the pre-set fixed sequence comprises:
      an indication that a first button of the mobile computing device has been pressed at a first time; and
      an indication that a second button of the mobile computing device has been pressed at a second time, the second time being within a predetermined time interval after the first time.

2. The computer-implemented method of claim 1, wherein the pre-set fixed sequence further comprises an indication that the first button of the mobile computing device has been pressed at a third time, the third time being after the second time.

3. The computer-implemented method of claim 2, wherein at least one of:
   (i) the indication that the first button of the mobile computing device has been pressed at the first time is an indication that the first button of the mobile computing device has been pressed a first particular number of times during a first time interval within the time interval, the first time interval following the first time;
   (ii) the indication that the second button of the mobile computing device has been pressed at the second time is an indication that the second button of the mobile computing device has been pressed a second particular number of times during a second time interval within the time interval, the second time interval following the second time; or
   (iii) the indication that the first button of the mobile computing device has been pressed at the third time is an indication that the first button of the mobile computing device has been pressed a third particular number of times during a third time interval within the time interval, the third time interval following the third time.

4. The computer-implemented method of claim 3, wherein each of the first particular number of times, the second particular number of times, and the third particular number of times is a plurality of times.

5. The computer-implemented method of claim 3, wherein time passing between the first time interval and the second time interval does not exceed 3 seconds, and wherein time passing between the second time interval and the third time interval does not exceed 3 seconds.

6. The computer-implemented method of claim 1, wherein the emergency contact is an emergency dispatch center associated with a current location of the mobile computing device.

7. The computer-implemented method of claim 1, wherein the emergency contact is a contact previously selected by a user of the mobile computing device.

8. The computer-implemented method of claim 1, wherein the pre-set fixed sequence is a first pre-set fixed sequence and the emergency contact is a first emergency contact, the computer-implemented method further comprising:
   determining, by the mobile computing device, that two or more external buttons of the plurality of external buttons of the mobile computing device have been pressed in a second pre-set fixed sequence over the time interval based upon the plurality of indications; and
   silently transmitting, by the mobile computing device, a second message to a computing device associated with a second emergency contact in response to determining the two or more external buttons of the mobile computing device having been pressed in the second pre-set fixed sequence.

9. The computer-implemented method of claim 1, wherein the two or more external buttons include a power button.

10. A mobile computing device for avoiding initiating accidental or unintentional transmission of a silent emergency message, the mobile computing device comprising:
    two or more external buttons;
    one or more processors; and
    one or more memories storing instructions that, when executed by the one or more processors, cause the mobile computing device to:
       receive a plurality of indications of a plurality of external buttons of the mobile computing device being pressed over a time interval;
       determine that two or more external buttons of the plurality of external buttons of the mobile computing device have been pressed in a pre-set fixed sequence over the time interval based upon the plurality of indications; and
       silently transmit a message to a computing device associated with an emergency contact in response to determining the two or more external buttons of the mobile computing device having been pressed in the pre-set fixed sequence, wherein the pre-set fixed sequence comprises:

an indication that a first button of the mobile computing device has been pressed at a first time; and an indication that a second button of the mobile computing device has been pressed at a second time, the second time being within a predetermined time interval after the first time.

11. The mobile computing device of claim 10, wherein the pre-set fixed sequence further comprises an indication that the first button of the mobile computing device has been pressed at a third time, the third time being after the second time.

12. The mobile computing device of claim 11, wherein at least one of:

(i) the indication that the first button of the mobile computing device has been pressed at the first time is an indication that the first button of the mobile computing device has been pressed a first particular number of times during a first time interval within the time interval, the first time interval following the first time;

(ii) the indication that the second button of the mobile computing device has been pressed at the second time is an indication that the second button of the mobile computing device has been pressed a second particular number of times during a second time interval within the time interval, the second time interval following the second time; or (iii) the indication that the first button of the mobile computing device has been pressed at the third time is an indication that the first button of the mobile computing device has been pressed a third particular number of times during a third time interval within the time interval, the third time interval following the third time.

13. The mobile computing device of claim 10, wherein the emergency contact is an emergency dispatch center associated with a current location of the mobile computing device.

14. The mobile computing device of claim 10, wherein the emergency contact is a contact previously selected by a user of the mobile computing device.

15. The mobile computing device of claim 10, wherein the pre-set fixed sequence is a first pre-set fixed sequence and the emergency contact is a first emergency contact, and wherein the instructions, when executed by the one or more processors, further cause the mobile computing device to:

determine that two or more external buttons of the plurality of external buttons of the mobile computing device have been pressed in a second pre-set fixed sequence over the time interval based upon the plurality of indications; and silently transmit a second message to a computing device associated with a second emergency contact in response to determining the two or more external buttons of the mobile computing device having been pressed in the second pre-set fixed sequence.

16. A tangible, non-transitory computer-readable medium storing executable instructions for avoiding initiating accidental or unintentional transmission of a silent emergency message that, when executed by at least one processor of a mobile computing device, cause the mobile computing device to:

receive a plurality of indications of a plurality of external buttons of the mobile computing device being pressed over a time interval;

determine that two or more external buttons of the plurality of external buttons of the mobile computing device have been pressed in a pre-set fixed sequence over the time interval based upon the plurality of indications; and silently transmit a message to a computing device associated with an emergency contact in response to determining the two or more external buttons of the mobile computing device having been pressed in the pre-set fixed sequence, wherein the pre-set fixed sequence comprises:

an indication that a first button of the mobile computing device has been pressed at a first time; and an indication that a second button of the mobile computing device has been pressed at a second time, the second time being within a predetermined time interval after the first time.

17. The tangible, non-transitory computer-readable medium of claim 16, wherein the pre-set fixed sequence further comprises an indication that the first button of the mobile computing device has been pressed at a third time, the third time being after the second time.

18. The tangible, non-transitory computer-readable medium of claim 17, wherein at least one of:

(i) the indication that the first button of the mobile computing device has been pressed at the first time is an indication that the first button of the mobile computing device has been pressed a first particular number of times during a first time interval within the time interval, the first time interval following the first time;

(ii) the indication that the second button of the mobile computing device has been pressed at the second time is an indication that the second button of the mobile computing device has been pressed a second particular number of times during a second time interval within the time interval, the second time interval following the second time; or (iii) the indication that the first button of the mobile computing device has been pressed at the third time is an indication that the first button of the mobile computing device has been pressed a third particular number of times during a third time interval within the time interval, the third time interval following the third time.

19. The tangible, non-transitory computer-readable medium of claim 16, wherein the message includes a current location of the mobile computing device.

20. The tangible, non-transitory computer-readable medium of claim 16, wherein the pre-set fixed sequence is a first pre-set fixed sequence and the emergency contact is a first emergency contact, and wherein the executable instructions, when executed by the at least one processor, further cause the mobile computing device to:

determine that two or more external buttons of the plurality of external buttons of the mobile computing device have been pressed in a second pre-set fixed sequence over the time interval based upon the plurality of indications; and silently transmit a second message to a computing device associated with a second emergency contact in response to determining the two or more external buttons of the mobile computing device having been pressed in the second pre-set fixed sequence.

* * * * *